United States Patent Office 2,889,299
Patented June 2, 1959

2,889,299

GREASE RESISTANT CELLULOSIC WEBS COATED WITH A LINEAR ANIONIC THERMOPLASTIC ETHYL ACRYLATE - ACRYLONITRILE - METHACRYLIC ACID POLYMER CONTAINING A HYDROPHILIC INORGANIC PIGMENT AS EXTENDER AND COMPOSITION FOR MANUFACTURE THEREOF

Daniel D. Ritson, Riverside, Conn., assignor to American Cyanamid Company, New York, N.Y., a corporation of Maine No Drawing. Application July 19, 1957
Serial No. 672,866

5 Claims. (Cl. 260—29.6)

The present invention relates to water-laid cellulosic webs carrying on at least one side a grease-resistant organic polymer coating containing finely divided hydrophilic inorganic material as extender. The invention includes aqueous emulsions of the polymer containing the extender.

The manufacture of paper which is resistant to penetration by grease, fats and oils is an important specialty of the papermaking art, the grease-resistant property being valuable where the paper is to be printed upon by a high gloss oil ink, or where the paper is to be used in contact with greasy foods or hydrocarbon greases. In the past, paper has generally been rendered grease-resistant by application of an aqueous solution of an oil-resistant film-forming material such as carboxymethyl cellulose or polyvinyl alcohol.

It has recently been found that paper of superior resistance to penetration by grease can be prepared by applying to the paper an aqueous emulsion of a flexible hydrophobic thermoplastic linear polymer followed by drying, the polymer forming a tough, resistant coating. Outstanding results were obtained with the coating agent formed by emulsion polymerizing a mixture of ethyl acrylate in major amount, acrylonitrile in minor amount, and methacrylic acid in small but effective amount as agent rendering the polymer anionic. The polymer, however is expensive, and as a result its utility in the paper-coating field has been limited.

The discovery has now been made that the covering capacity of anionic emulsion containing the aforesaid polymer is extended without apparent decrease in the grease resistance of the cellulosic web when there is incorporated in the emulsion one or more finely divided hydrophilic inorganic materials having a particle size within the pigmentary range.

The invention is based on the discovery that a substantial amount of such inorganic material, up to about ¾ of the weight of the polymer, can be incorporated in the emulsion as extender and that notwithstanding the presence of such inorganic matter the capacity of the polymer to form a continuous grease-impermeable film is substantially unaffected. This result was unexpected as inorganic pigmentary material possesses considerable affinity for oils, and cellulosic webs coated with mineral pigment in the past have possessed virtually no grease resistance at all. The present invention thus permits saving up to about half of the polymer.

The value of ¾, recited above, is critical. When materially more inorganic material is employed, the grease resistance of the applied coating abruptly falls to a value of nearly zero. In practice I prefer to limit the amount of inorganic material to about ⅔ of the weight of the polymer, this amount being sufficient to extend the covering capacity of the emulsion very greatly yet avoiding the danger of having too much present. On the other hand, the amount of inorganic material should be at least about ⅕ of the weight of the polymer, as a less amount generally does not extend the covering capacity sufficiently to justify the added labor involved.

The finely divided hydrophilic inorganic material present in the polymer emulsions specified above may be any such material having an average particle size within the pigmentary range, i.e., between about 0.1 and 4 microns. Materials which have been successfully used for this purpose include mica, silica, calcium carbonate, barium sulfate, clay, talc, and titanium dioxide. These materials are all hydrophilic. The lower particle size range of 0.2–1 micron is preferred as in this range best resistance to penetration by greases is generally obtained.

The coating compositions are applied in any convenient manner, for example, by roll-coater, wire-wound doctor, spray or doctor blade. A satisfactory grease-proof film develops on air drying, but the grease-resistant properties of the film are best developed by heating the cellulosic web in the range of 150°–250° F. or more for 1–10 minutes to dry the web and consolidate the polymer with the pigment and the fibers so as to form a continuous uniform coating.

The present invention does not depend upon the particular way in which the coating composition is prepared. The film-forming polymer may be prepared by emulsion polymerizing the ethyl acrylate, acrylonitrile, and methacrylic acid. According to this method a homogeneous mixture of the monomers is slowly added with vigorous agitation to hot water containing an anionic emulsifying agent and a persulfate catalyst. A vinyl polymerization occurs with formation of a stable colloidal emulsion. When the polymerization has gone to substantial completion, unreacted monomer is stripped off and the pH adjusted to alkalinity. Preferably the pH is adjusted to a value within the range 8–10, and ammonia is used so that the polymer is present in at least predominantly ammonium salt form.

The coating compositions are prepared by mixing an aqueous suspension or "slip" of inorganic pigmentary material with the emulsion in amount sufficient to provide extension within the range recited above.

The amount of water should be predetermined to provide a coating composition having the desired viscosity. Suitable viscosities fall within the range of 50 to 500 centipoises depending principally upon the type of application method employed.

In practice best grease resistance coupled with best flexibility, best adhesion, and lowest tack generally result when the mixture of vinyl monomers referred to above contains about 55% to 85% by weight of ethyl acrylate, about 45% to 20% by weight of acrylonitrile, and about 0.5%–1% by weight of methacrylic acid. It will be understood that the invention includes emulsions prepared from known equivalents of these monomers.

The invention will be more particularly described in the examples which follow. These examples represent embodiments of the invention and are not to be construed in limitation thereof.

*Example 1*

The following illustrates the preparation and testing of a series of coating compositions according to the present invention containing a variety of finely-divided inorganic materials as extenders, the application of the compositions to paper, and the testing of the papers thus obtained.

An aqueous anionic polymer emulsion was prepared by slowly adding 1000 parts by weight of a 70:29:1 molar ratio mixture of ethyl acrylate:acrylonitrile:methacrylic acid with vigorous agitation to 1000 parts of water at 95° C. containing 45 parts of sodium lauryl sulfate and 7.5 parts of sodium bicarbonate. At the same time there was proportioned into the water with the mixture of monomers 150 parts of a 2% by weight of an aqueous solution of $(NH_4)S_2O_8$ as catalyst. After all of the monomer mixture had been added, an additional 100 parts of catalyst solution was added and the mixture allowed to react at 95° C. When the vinyl polymerization had substantially ceased, unreacted monomer was stripped off by live steam and the pH of the emulsion adjusted to 9.5 by addition of ammonium hydroxide, thereby converting the combined methacrylic acid preponderantly to ammonium salt form.

Pigment suspensions were made by vigorously agitating 68 parts of pigment material shown in the table below with 32 parts of water containing 0.2 part of sodium carbonate and 0.2 part of sodium tetraphosphate as dispersing aids.

Coating compositions were made by blending sufficient pigment suspension in each instance with 100 parts of the polymer emulsion to form a coating composition having the solids content shown in the table below.

Each of the compositions thus prepared was applied to label base stock by a Bird applicator having a 0.0006" orifice to give a 0.0003" coating. Sheets were also coated with unmodified polymer emulsion as control. All sheets were dried at room temperature and oven-dried at 220° F. for three minutes to develop the grease-resistant properties of the coating. The thickness of the coating after drying was calculated as about 0.00015", which is about the thinnest applied commercially.

The sheets were tested for grease resistance according to TAPPI Standards Test T–454–m–44, wherein small (approximately 5 gm.) cones of sand are formed on the paper and grease resistance is determined as the number of minutes required for 1.1 ml. of turpentine (containing oil soluble red dye) added to each cone to penetrate the sheet. The endpoint of the test is the time for first penetration and test is stopped after 480 minutes because of evaporation of turpentine. In this test, resistance of coating material at the very thin film thickness described above to penetration by turpentine for the full 480 minute period is regarded as excellent.

Results are as follows.

| No. | Coating composition | | | | |
|---|---|---|---|---|---|
| | Pigment | pH | Percent solids [1] | Percent pigment [2] | Grease resistance [3] |
| (Control | None | 8.6 | 45.8 | | >480) |
| 1 | $TiO_2$ | 8.4 | 45.4 | 43 | >480 |
| 2 | $CaCO_3$ | 8.2 | 45.6 | 43 | >480 |
| 3 | Mica | 8.4 | 44.5 | 43 | >480 |
| 4 | Talc | 8.4 | 44.5 | 43 | >480 |
| 5 | Clay | 8.6 | 50.1 | 43 | >480 |
| 6 | do | 8.6 | 53.0 | 72 | >480 |
| (7 | do | 8.1 | 52.3 | 100 | 150) |
| (8 | do | 8.4 | 56.5 | 150 | 15) |

[1] Total solids based on weight of emulsion.
[2] Weight of pigment based on weight of polymer.
[3] Minutes, by TAPPI test T–454–m–44 test.

Comparison of run 6 (embodying the invention) with bracketed runs 7 and 8 (outside the scope of the invention) demonstrates the rapid decline in grease resistance which occurs when too much extender is present.

I claim:

1. A fluid composition which when applied to a water-laid cellulosic web and dried thereon provides said web with a flexible adherent coating having excellent resistance to penetration by greases yet contains a substantial amount of mineral matter as extender, which consists essentially of an aqueous anionic emulsion of the oil-in water type of a linear anionic film-forming thermoplastic polymer in predominantly ammonium salt form prepared by vinyl polymerization of ethyl acrylate in major amount, acrylonitrile in minor amount, and methacrylic acid in small but effective amount as agent rendering said polymer anionic, said emulsion having uniformly distributed through the aqueous phase thereof a hydrophilic inorganic pigment in amount between about ⅓ and ¾ of the weight of said polymer.

2. A composition according to claim 1 having a pH in the range of 8–10.

3. A composition according to claim 1 wherein the particle size of the pigment is between about 0.2 and 1 micron.

4. A composition according to claim 1 wherein the pigment is paper-coating clay.

5. A water-laid cellulosic web resistant to penetration by greases coated on at least one side with a linear anionic thermoplastic polymer prepared by vinyl condensation of a major amount of ethyl acrylate, a minor amount of acrylonitrile, and a small but effective amount of methacrylic acid as agent rendering said polymer anionic, said polymer having uniformly distributed therethrough a hydrophilic inorganic pigment as extender, the weight of said pigment being between about ⅓ and ¾ of the weight of the polymer.

References Cited in the file of this patent

UNITED STATES PATENTS

| | | |
|---|---|---|
| 2,572,252 | Erasmus | Oct. 23, 1951 |
| 2,753,318 | Maeder | July 3, 1956 |
| 2,787,603 | Sanders | Apr. 2, 1957 |